US006467320B1

(12) United States Patent
Choo

(10) Patent No.: US 6,467,320 B1
(45) Date of Patent: Oct. 22, 2002

(54) DOOR LOCKING APPARATUS OF AUTOMOBILE

(75) Inventor: Jin-Su Choo, Ulsan (KR)

(73) Assignee: Hyundai Motor Company, Seoul (KR)

( * ) Notice: Subject to any disclaimer, the term of this patent is extended or adjusted under 35 U.S.C. 154(b) by 97 days.

(21) Appl. No.: 09/675,040

(22) Filed: Sep. 28, 2000

(30) Foreign Application Priority Data

Dec. 28, 1999 (KR) ........................................... 99-63354

(51) Int. Cl.$^{7}$ .......................... B60R 25/00; E05B 65/12

(52) U.S. Cl. ................................ 70/256; 292/DIG. 29; 292/DIG. 43

(58) Field of Search .......................... 70/256, 263, 265; 292/DIG. 29, DIG. 43, 221, 223, 196

(56) References Cited

U.S. PATENT DOCUMENTS 5,117,665 A * 6/1992 Swan et al. .................. 70/264
5,947,536 A * 9/1999 Mizuki et al. .............. 292/201
6,017,067 A * 1/2000 Yoneyama et al. ............ 1/200
6,338,508 B1 * 1/2002 Kleefeldt .................... 292/201
6,343,494 B2 * 2/2002 Roos et al. ................... 70/264

* cited by examiner

*Primary Examiner*—Anthony Knight
*Assistant Examiner*—John B. Walsh
(74) *Attorney, Agent, or Firm*—Christie, Parker & Hale, LLP

(57) ABSTRACT

A door locking apparatus of an automobile is provided wherein inner and outer handles mounted at a door of an automobile for releasing a latch transfer the manipulating force to the latch by an integrated link member, thereby shortening an assembly process of the tailgate by reducing the number of required parts and also reduce the manufacturing cost. The apparatus has an inner handle mounted inside of a door of the automobile, an outer handle mounted outside of the door of the automobiles, a locking device for releaseably locking the door, and link having a first movable member for receiving a manipulating force of the outer handle and a second movable member rotated by the first movable member and the inner handle to release the latch.

5 Claims, 3 Drawing Sheets

DOOR LOCKING APPARATUS OF AUTOMOBILE

BACKGROUND OF THE INVENTION

1. Field of the Invention

The present invention relates to a door locking apparatus of automobile, and more particularly to a door locking apparatus of an automobile adapted to simplify the structure of a link means forming a locking apparatus of a tailgate of the automobile to improve assembly workability.

2. Description of the Prior Art

Generally, an automobile is equipped with hinged doors for passengers to get in and to get off therethrough and for cargoes to be loaded and unloaded. One of the doors called a tailgate of life-up type is widely adopted as a rear door of a hatchback style vehicle.

Meanwhile, a locking apparatus at the tailgate includes, as illustrated in FIG. 1, an inner handle 12 and an outer handle 14 respectively mounted at an inner and an outer side of the tailgate 10, a latch 16 for changing a lock-up state of the tailgate 10 to a releaseable state according to manipulation of inner and outer handles 12 and 14, and first and second link means 18 and 20 for transferring a manipulating force applied from the inner and outer handles 12 and 14 to the latch 16.

The locking apparatus of the tailgate 10 further includes a locking knob 22 protruded to a lower portion of a door glass 11 to manipulatively maintain a lock-up state of the latch 16 inside an automobile, third link means 24 for transferring the manipulating force applied to the locking knob 22 to the latch 16 and a key assembly 26 for controlling an operation of the third link means 24 at outside of the automobile to operate the latch 16.

At this time, the first link means 18 for connecting the inner handle 12 to the latch 16 to transfer the manipulating force applied to the inner handle 12 to the latch 16 and the second link means 20 for connecting the outer handle 14 to the latch 16 to transfer the manipulating force applied to the outer handle 14 to the latch 16 have the same structure except that they are directed in the opposite direction.

In other words, the first link means 18 and the second link means 20 are respectively formed with a first rod 28 for being connected to the inner handle 12 and the outer handle 14, a movable member 32 for connecting the first rod 28 at one end thereof and for connecting at the other end thereof a second rod 30 coupled to the latch 16 and a fixing member 34 fixed to the tailgate 10 for rotatably mounting the movable member 32 as illustrated in FIG. 2. The movable member 32 and the fixing member 34 are axially coupled each via a rotary shaft 33, such that the movable member 32 can be rotatably mounted on the fixing member 34 via the rotary shaft 33.

The fixing member 34 is integrally formed at a tip end thereof with protruders 35, each one facing the other, to restrict the rotating angle of the movable member 32.

Unexplained reference numerals 28*a* and 30*a* in the drawing are attachment members for fixing the first and second rod 28 and 30 to the movable member 32.

When the tailgate 10 is to be opened inside the automobile, the inner handle 12 is manipulated to pull the first rod 28 at the first link means 18 and to rotate the movable member 32 axially supported by the fixing member 34 according to manipulating force applied to the first rod 28. Successively, the second rod 30 is pushed by the rotation of the movable member 32 and the latch 16 is activated by the manipulating force according to the push of the second rod 30 to open the tailgate 10.

At this time, the protruder 35 at the fixing member 34 applies a restriction to a certain degree to the movable member 32 rotating about the rotary shaft 33. This is because the second rod 30 pulled via the first link means by the manipulating force applied to the first rod 28 is forcibly restricted in its moving distance to thereby prevent the latch 16 from receiving an excessive manipulating force.

Furthermore, even when the tailgate 10 is to be opened from outside of the automobile, operations described above are repeated to open the tailgate 10.

However, there is a problem in the locking apparatus of tailgate 10 thus described according to the prior art in that the manipulating force applied to the inner handle 12 or the outer handle 14 is transmitted via the first link means 18 or the second link means 20 to the latch 16, making component parts, especially the link member, complicated in construction thereof. This kind of problem may complicate work process and increase manufacturing cost in installing a locking apparatus when the tailgate 10 is assembled.

SUMMARY OF THE INVENTION

The present invention is disclosed to solve the aforementioned problems and it is an object of the present invention to provide a door locking apparatus of an automobile adapted to enable transmittal of the manipulating force applied respectively from an inner handle and an outer handle to a latch through one link member, thereby simplifying parts comprising the locking apparatus of a tailgate. It is another object of the present invention to provide a door locking apparatus of an automobile adapted to shorten the process when a tailgate is assembled and to reduce manufacturing cost.

In accordance with one object of the present invention, there is provided a door locking apparatus of automobile, the apparatus comprising:

- an inner handle mounted inside of a door of the automobile;
- an outer handle mounted outside of a door of the automobile;
- a locking device for releaseably locking the door; and
- link means having a first movable member for receiving a manipulating force of the outer handle to rotate thereby and a second movable member rotated by the first movable member and the inner handle to release the latch under locked state.

In accordance with another object of the present invention, the first movable member and the second movable member are coaxially and rotably mounted on an identical rotary shaft, and the first movable member is arranged at one side thereof with a protruder contacting one side of the second movable member such that, when the first movable member is rotated, the second movable member is rotated in the same direction by the protruder while only the second movable member is rotated when the second movable member is rotated.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, a preferred embodiment of the present invention will be described in detail with reference to the accompanying drawings.

Figure 1:
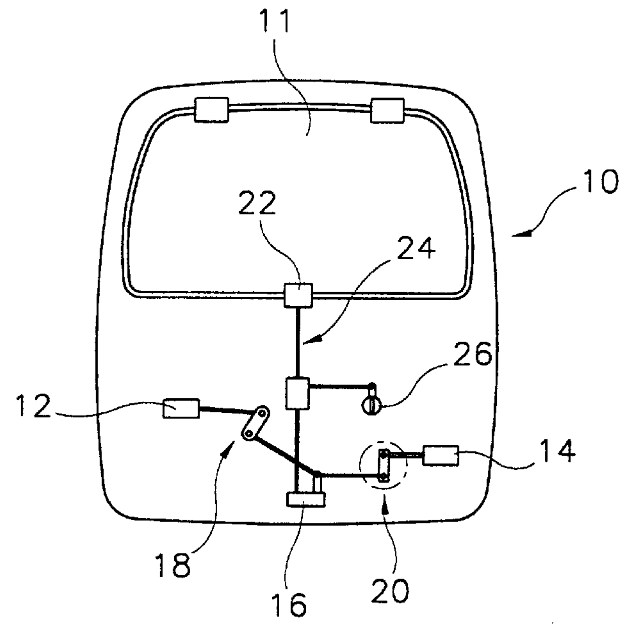
FIG.1 (prior art)
FIG. 1 is a schematic drawing for illustrating a construction of a locking apparatus mounted at a tailgate of an automobile according to the prior art.
Figure 3:
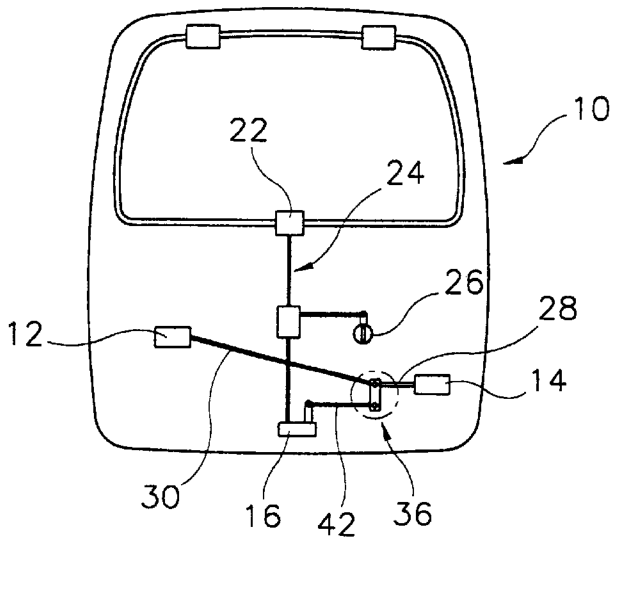
FIG. 3 is a schematic drawing for illustrating construction of a locking apparatus mounted at a tailgate of an automobile according to the present invention.
Figure 2:
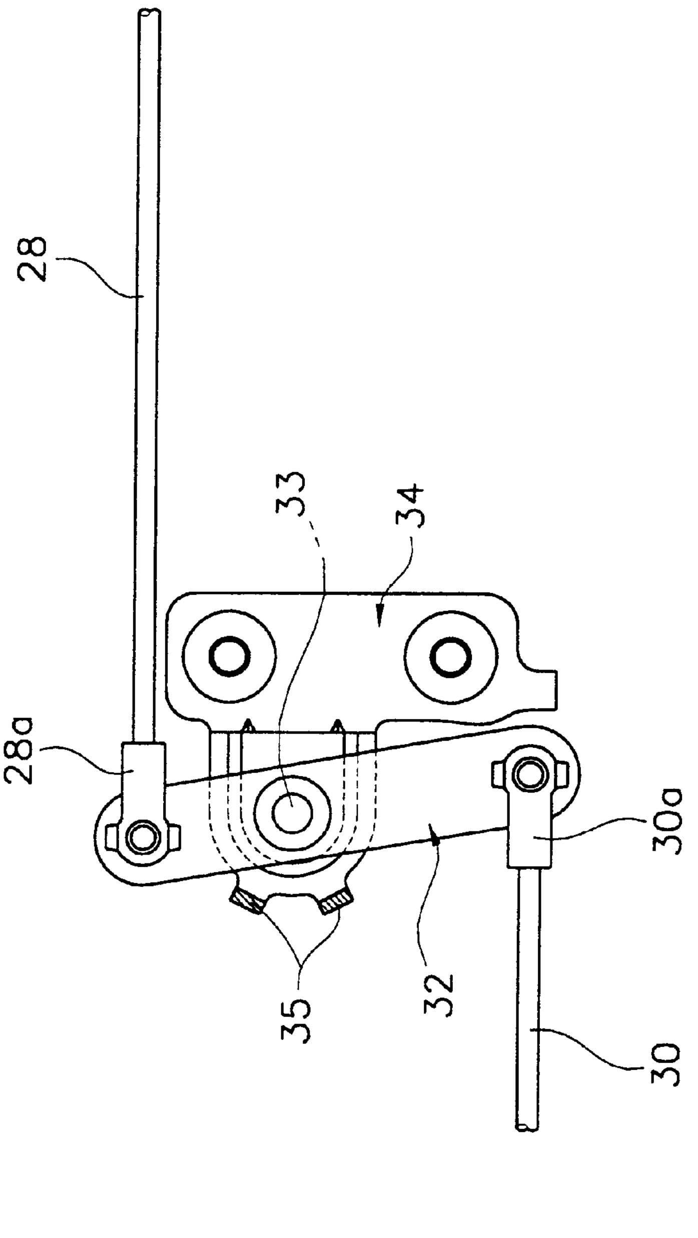
FIG. 2 (prior art)
FIG. 2 is a constitutional drawing for illustrating principal parts enlarged from FIG. 1.
Figure 4:
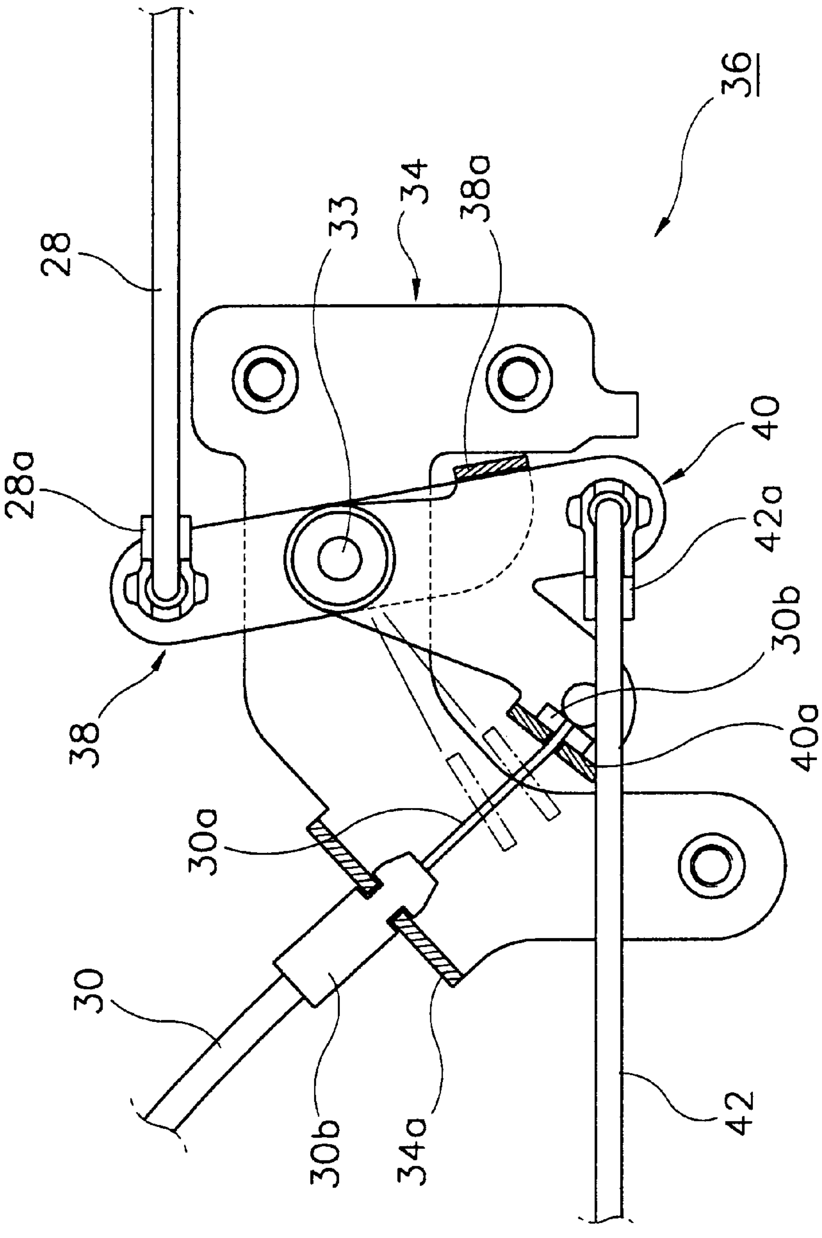
FIG. 4 is a constitutional drawing for illustrating principal parts enlarged from FIG. 3.

FIG. 3 is a schematic drawing for illustrating construction of a locking apparatus mounted at a tailgate of an automobile according to the present invention, while FIG. 4 is a constitutional drawing for illustrating principal part enlarged from FIG. 3. Throughout the drawings, like reference numerals and symbols are used for designation of like or equivalent parts or portions as in FIGS. 1 and 2 for simplicity of illustration and explanation.

The door locking apparatus of an automobile according to the present invention as illustrated in the drawings includes inner and outer handles 12 and 14 respectively mounted at inner and outer side of a tailgate 10 which are manipulated to open and close a door, a latch 16 for changing the tailgate 10 to a locked or unlocked state according to manipulation of the inner and outer handle 12 and 14 and Furthermore, the locking apparatus of the tailgate 10 further includes a locking knob 22 protruded to a lower end of a door glass 11 to manipulatively maintain the locked state of the latch 16 inside the automobile, third link means for transmitting the manipulating force applied to the locking knob 22 to the latch 16 and a key assembly body 26 for controlling the operation of the third link means at outside of the automobile to operate the latch 16.

The integrated link means 36 is an integrated device where functions of the conventional first link means 18 for connecting the inner handle 12 to latch 16 to transfer the manipulating force applied to the inner handle 12 to the latch 16 and of the conventional second link means 20 for connecting the outer handle 14 to the latch 16 to transfer the manipulating force enforced to the outer handle 14 to the latch 16 are combined.

In other words, the integrated link means 36 is provided, as illustrated in FIG. 4, with a first movable member 38 for coupling a first rod 28 connected to the outer handle 14 to one end thereof while a center thereof is axially and rotably supported, a second movable member 40 axially supported at one tip end thereof for being cooperatively rotated by rotation of the first movable member 38, a second rod 30 coupled to a tip end of the second movable member 40 for connection to the inner handle 12, a third rod 42 coupled to the other tip end of the second movable member 40 for connection to the latch 16 and a fixing member 34 for rotably supporting the first and second movable members 38 and 40 via a rotary axle 33 and being coupled to the tailgate 10. The first movable member 38 is integrally formed with a protruder 38*a* for pressingly contacting and rotating the second movable member 40 by cooperatively rotating with the first movable member 38 when the first movable member 38 is rotated by the first rod 28 pulled by the manipulation of the outer handle 14.

Furthermore, the second movable member 40 is branched out in two-pronged way, one prong thereof coupled with the rotary axle 33 and the other prong thereof with a protruder 40*a* for fixing one tip end of wire 30*a* at the second rod 30 connected to the inner handle 12, where the second rod 30 is a cable inherently formed with the wire 30*a* thereinside. The wire 30*a* is so made as to be pulled by manipulation of the inner handle 12 and is installed at one tip end thereof with a hitching piece 30*b* for being insertedly coupled to the protruder 40*a* of the second movable member 40.

Furthermore, the second movable member 40 is coupled at the other branched prong thereof with a third rod 42 connecting to the latch 16. The wire 30*a* in the second rod 30 is pulled to rotate the second movable member 40 around the rotary axle 33 when the inner handle 12 is manipulated. The fixing member 34 is formed with a protruder 34*a* for fixing a fastening member 30*b* coupled at a tip end of the second rod 30.

Meanwhile, the first movable member 38 rotably and axially mounted at the fixing member 34 via the rotary axle 33 transfers a manipulating force to the latch 16 through the second movable member 40 and the third rod 42 to enable to open the tailgate 10 when the first movable member 38 receives the manipulating force via the first rod 28 according to the manipulation of the outer handle 14.

Conversely, the second movable member 40 rotably and axially mounted at the fixing member 34 via the rotary axle 33 transfers a manipulating force to the latch 16 through the second movable member 40 and the third rod 42 to enable to open the tailgate 10 when the second movable member 40 receives the manipulating force via the wire 30*a* of the second rod 30 according to manipulation of the inner handle 12. At this time, the second movable member 40 has no effect on the first movable member 38 to independently rotate.

Unexplained reference numerals 28*a* and 42*a* in the drawing are coupling members for fixing the first rod 28 and the third rod 42 to the first movable member 38 and the second movable member 40 respectively.

When the tailgate 10 is opened at outside of the automobile, the outer handle 14 is manipulated to pull the first rod 28 of the integrated link means 36 and to rotate the first movable member 38 axially supported at the fixing member 34 by the manipulating force applied to the first rod 28, such that the second movable member 40 pushed by the protruder 38a according to rotation of the first movable member 38, is rotated. The latch 16 is activated by the manipulating force received through the third rod 42 to open the tailgate 10.

At this time, the protruder 38*a* of the first movable member 38 contacts a portion of the second movable member 40 to forcibly rotate the second movable member 40 while the protruder 40*a* formed at one tip end of the second movable member 40 has no effect on the wire 30*a* of the second rod 30 even though the second movable member 40 is rotated, as shown in dotted line in FIG. 4. This is because the hitching piece 30*b* coupled to a tip end of the wire 30*a* at the second rod 30 is not pushed by the protruder 40*a* of the second movable member 40.

Meanwhile, when the tailgate 10 is opened inside the automobile, the inner handle 12 is manipulated to pull the second rod 30 at the integrated link means 36 to pull the wire 30*a* according to the manipulating force applied to the second rod 30 and to rotate the second movable member 40 axially supported at the fixing member 34, where the latch 16 receives the manipulating force according to the rotation of the second movable member 40 via the third rod 42 to activate thereby to open the tailgate 10.

At this time, the second movable member 40 has no effect on the first movable member 38 when the second movable member 40 is rotated by the manipulation of the inner handle 12. This is because the rotating direction of the second movable member 40 is not the direction pushing the protruder 38*a* formed at the first movable member 38.

As apparent from the foregoing, there is an advantage in the door locking apparatus of automobile thus described according to the present invention in that the inner and outer handles 12 and 14 mounted at the tailgate 10 to release the latch 16 transfer the manipulating force to the latch 16 not by separate link members but by integrated link means 36, thereby shortening an assembly process of the tailgate 10 by reducing the number of required parts and reducing the manufacturing cost.

What is claimed is:

1. A door locking apparatus of automobile, the apparatus comprising:

an inner handle mounted inside of a door of the automobile;

an outer handle mounted outside of a door of the automobile;

a locking device for releaseably locking the door; and a link having a first movable member for receiving a manipulating force of the outer handle to rotate thereby and a second movable member rotated by the first movable member and the inner handle to release the latch, wherein the second movable member is rotated by the first movable member when the first movable member is rotated, wherein the second movable member is rotated by actuating the inner handle, wherein the first movable member and the second movable member are coaxially and rotably mounted about a rotary shaft, and the first movable member comprises at one side thereof a protruder contacting one side of the second movable member, wherein when the first movable member is rotated, the second movable member is rotated in the same direction by the protruder, wherein only the second movable member is rotated when the second movable member is rotated.

2. The apparatus as defined in claim 1 further comprising:

a first rod for connecting the outer handle to the first movable member;

a second rod for connecting the inner handle to the second movable member; and a third rod for connecting the latch to the second movable member.

3. The apparatus as defined in claim 1 further comprising a fixing member for rotably supporting the first movable member and the second movable member via the rotary shaft.

4. The apparatus as defined in claim 2, wherein the second rod is a cable having a wire disposed therein and the wire is fixedly connected to the second movable member.

5. The apparatus as defined in claim 1 wherein the second movable member is rotated by actuating the inner handle without rotating the first movable member.

* * * * *